(12) United States Patent
Preisler et al.

(10) Patent No.: US 11,691,575 B2
(45) Date of Patent: *Jul. 4, 2023

(54) SANDWICH-TYPE, COMPOSITE COMPONENT HAVING A SPRAYED BACKSIDE PROTECTIVE COATING

(71) Applicant: Global IP Holdings, LLC, Sterling Heights, MI (US)

(72) Inventors: Darius J. Preisler, Macomb, MI (US); Christopher A. Heikkila, Washington Township, MI (US); Scott A. Grajek, Washington Township, MI (US); Jason T. Murar, Macomb, MI (US)

(73) Assignee: Global IP Holdings, LLC, Sterling Heights, MI (US)

( * ) Notice: Subject to any disclaimer, the term of this patent is extended or adjusted under 35 U.S.C. 154(b) by 70 days.

This patent is subject to a terminal disclaimer.

(21) Appl. No.: 16/518,109

(22) Filed: Jul. 22, 2019

(65) Prior Publication Data

US 2021/0024015 A1   Jan. 28, 2021

(51) Int. Cl.
*B60R 13/08* (2006.01)
*B32B 27/08* (2006.01)
(Continued)

(52) U.S. Cl.
CPC .......... *B60R 13/083* (2013.01); *B29C 43/203* (2013.01); *B32B 3/12* (2013.01); *B32B 5/024* (2013.01); *B32B 27/08* (2013.01); *B32B 27/32* (2013.01); *B60R 13/013* (2013.01); *B29K 2023/12* (2013.01); *B29K 2105/0845* (2013.01); *B29K 2309/08* (2013.01); *B29L 2031/3005* (2013.01); *B32B 2250/05* (2013.01);
(Continued)

(58) Field of Classification Search
CPC ........................... B60R 13/083; B60R 13/013
See application file for complete search history.

(56) References Cited

U.S. PATENT DOCUMENTS 5,026,445 A   6/1991  Mainolfi et al.
5,409,986 A   4/1995  Boudry et al.
(Continued)

FOREIGN PATENT DOCUMENTS

WO   WO-2016028359 A2 *   2/2016   ............. B29B 13/02

OTHER PUBLICATIONS

Fivella, J.; "Low-buck Modding With the Plasti Dip Spray", 2013, p. 1-5. Accessed at http://www.mustangandfords.com/how-to/paint-body/1401-low-buck-modding-with-the-plasti-dip-spray/ (Year: 2013).*
(Continued)

*Primary Examiner* — Mark Ruthkosky
*Assistant Examiner* — Julia L Rummel
(74) *Attorney, Agent, or Firm* — Brooks Kushman P.C.

(57) ABSTRACT

A sandwich-type, composite component having a sprayed backside protective coating is provided. The component includes a first outer layer having an outer surface, a second outer layer and a core positioned between and bonded to the outer layers and having a plurality of cavities. The protective coating is integrally formed from an elastomeric material. The material is sprayed to form the coating and the coating is bonded to the outer surface by curing. The component may be a vehicle interior component such as a vehicle load floor component.

13 Claims, 4 Drawing Sheets

(51) Int. Cl.
*B29C 43/20* (2006.01)
*B32B 5/02* (2006.01)
*B32B 27/32* (2006.01)
*B60R 13/01* (2006.01)
*B32B 3/12* (2006.01)
*B29K 23/00* (2006.01)
*B29K 105/08* (2006.01)
*B29K 309/08* (2006.01)
*B29L 31/30* (2006.01)

(52) U.S. Cl.
CPC ....... *B32B 2250/40* (2013.01); *B32B 2255/10* (2013.01); *B32B 2255/26* (2013.01); *B32B 2307/102* (2013.01); *B32B 2605/003* (2013.01); *B60R 2013/016* (2013.01); *B60Y 2306/09* (2013.01); *Y10T 428/24149* (2015.01)

(56) References Cited

U.S. PATENT DOCUMENTS

| | | | |
|---|---|---|---|
| 5,502,930 | A | 4/1996 | Burkette et al. |
| 5,534,097 | A | 7/1996 | Fasano et al. |
| 5,915,445 | A | 6/1999 | Rauenbusch |
| 6,050,630 | A | 4/2000 | Hochet |
| 6,066,217 | A | 5/2000 | Dibble et al. |
| 6,102,464 | A | 8/2000 | Schneider et al. |
| 6,435,577 | B1 | 8/2002 | Renault |
| 6,537,413 | B1 | 3/2003 | Hochet et al. |
| 6,655,299 | B2 | 12/2003 | Preisler et al. |
| 6,682,675 | B1 | 1/2004 | Vandangeot et al. |
| 6,682,676 | B1 | 1/2004 | Renault et al. |
| 6,748,876 | B2 | 6/2004 | Preisler et al. |
| 6,752,443 | B1 | 6/2004 | Thompson et al. |
| 6,790,026 | B2 | 9/2004 | Vandangeot et al. |
| 6,800,325 | B2 | 10/2004 | Ehrath et al. |
| 6,825,803 | B2 | 11/2004 | Wixforth et al. |
| 6,843,525 | B2 | 1/2005 | Preisler |
| 6,890,023 | B2 | 5/2005 | Preisler et al. |
| 6,905,155 | B1 | 6/2005 | Presley et al. |
| 6,926,348 | B2 | 8/2005 | Krueger et al. |
| 6,945,594 | B1 | 9/2005 | Bejin et al. |
| 6,981,863 | B2 | 1/2006 | Renault et al. |
| 7,059,646 | B1 | 6/2006 | DeLong et al. |
| 7,090,274 | B1 | 8/2006 | Khan et al. |
| 7,121,601 | B2 | 10/2006 | Mulvihill et al. |
| 7,188,881 | B1 | 3/2007 | Sturt et al. |
| 7,207,616 | B2 | 4/2007 | Sturt |
| 7,222,915 | B2 | 5/2007 | Philippot et al. |
| 7,419,713 | B2 | 9/2008 | Wilkens et al. |
| 7,628,440 | B2 | 12/2009 | Bernhardsson et al. |
| 7,909,379 | B2 | 3/2011 | Winget et al. |
| 7,919,031 | B2 | 4/2011 | Winget et al. |
| 8,117,972 | B2 | 2/2012 | Winget et al. |
| 8,133,419 | B2 | 3/2012 | Burks et al. |
| 8,298,675 | B2 | 10/2012 | Alessandro et al. |
| 8,475,884 | B2 | 7/2013 | Kia |
| 8,622,456 | B2 | 1/2014 | Preisler et al. |
| 8,690,233 | B2 * | 4/2014 | Preisler .................... B60R 5/04 296/193.07 |
| 8,834,985 | B2 | 9/2014 | Preisler et al. |
| 9,139,142 | B2 | 9/2015 | Demo et al. |
| 9,770,849 | B2 | 9/2017 | Preisler et al. |
| RE49,064 | E * | 5/2022 | Preisler .................... B60R 5/04 |
| 2004/0078929 | A1 | 4/2004 | Schoemann |
| 2004/0244903 | A1* | 12/2004 | Parrish ................ D06N 7/0071 156/245 |
| 2005/0189674 | A1 | 9/2005 | Hochet et al. |
| 2006/0008609 | A1 | 1/2006 | Snyder et al. |
| 2006/0255611 | A1 | 11/2006 | Smith et al. |
| 2007/0065264 | A1 | 3/2007 | Sturt et al. |
| 2007/0256379 | A1 | 11/2007 | Edwards |
| 2007/0299193 | A1* | 12/2007 | Sauer ....................... C08J 5/046 524/495 |
| 2008/0185866 | A1 | 8/2008 | Tarrant et al. |
| 2009/0108639 | A1 | 4/2009 | Sturt et al. |
| 2010/0206467 | A1 | 8/2010 | Durand et al. |
| 2011/0062742 | A1 | 3/2011 | Alford |
| 2011/0260359 | A1 | 10/2011 | Durand et al. |
| 2011/0315310 | A1* | 12/2011 | Trevisan ................. B29C 70/68 156/245 |
| 2012/0164367 | A1* | 6/2012 | Delmas ................. B29D 24/005 428/85 |
| 2012/0247654 | A1 | 10/2012 | Piccin et al. |
| 2012/0315429 | A1 | 12/2012 | Stamp et al. |
| 2013/0031752 | A1 | 2/2013 | Davies |
| 2013/0075955 | A1 | 3/2013 | Piccin et al. |
| 2013/0137798 | A1 | 5/2013 | Piccin |
| 2013/0264423 | A1 | 10/2013 | Hebensperger et al. |
| 2013/0278002 | A1 | 10/2013 | Preisler et al. |
| 2013/0278003 | A1 | 10/2013 | Preisler et al. |
| 2013/0278007 | A1* | 10/2013 | Preisler ................. B60R 13/011 296/97.23 |
| 2013/0278009 | A1 | 10/2013 | Preisler et al. |
| 2013/0278015 | A1 | 10/2013 | Preisler et al. |
| 2013/0278018 | A1* | 10/2013 | Preisler ................. B60R 13/013 296/193.07 |
| 2013/0278019 | A1 | 10/2013 | Preisler et al. |
| 2013/0278020 | A1 | 10/2013 | Preisler et al. |
| 2013/0280459 | A1 | 10/2013 | Nakashima et al. |
| 2013/0280472 | A1 | 10/2013 | Preisler et al. |
| 2013/0280473 | A1 | 10/2013 | Preisler et al. |
| 2016/0361894 | A1* | 12/2016 | Ciuperca ............... B29C 44/321 |
| 2018/0290418 | A1* | 10/2018 | Nelson .................... B32B 27/08 |

OTHER PUBLICATIONS

Industrial Rubber Goods, "How and Why do we Use Natural and Synthetic Rubber?", 2011, p. 1-2. Accessed at https://web.archive.org/web/20110411202622/http://www.industrialrubbergoods.com/articles/natural-synthetic-rubber.html (Year: 2011).*

Industrial Rubber Goods, "How and Why do we Use Natural and Synthetic Rubber?", 2011, p. 1; Accessed at https://web.archive.org/web/20110411202622/http://www.industrialrubbergoods.com/articles/natural-synthetic-rubber.html.*

United States Court of Appeals, Federal Circuit, In re Nordt Dev. Co., 881 F.3d 1371 (Fed. Cir. 2018), Decided Feb. 8, 2018.

United States Patent and Trademark Office, Non-Final Office Action for U.S. Appl. No. 16/518,199 (GIPH 0193 PUS), dated Jan. 21, 2021.

* cited by examiner

SANDWICH-TYPE, COMPOSITE COMPONENT HAVING A SPRAYED BACKSIDE PROTECTIVE COATING

CROSS-REFERENCE TO RELATED APPLICATIONS

This application is related to U.S. patent application Ser. No. 16/518,199, entitled "Sandwich-type, Composite Component Having an Injection Molded Backside Protective Covering," filed Jul. 22, 2019 on the same day as this application.

TECHNICAL FIELD

This invention relates, in general, to the field of composite components having sandwich structures and, in particular, to such components which have a sprayed, backside protective coating.

OVERVIEW

The term "facing material" refers to a material used to conceal and/or protect structural and/or functional elements from an observer. Common examples of facing materials include upholstery, carpeting, and wall coverings (including stationary and/or moveable wall coverings and cubicle wall coverings). Facing materials typically provide a degree of aesthetic appearance and/or feel, but they may also provide a degree of physical protection to the elements that they conceal. In some applications, it is desirable that the facing material provide properties such as, for example, aesthetic appeal (for example, visual appearance and/or feel) and abrasion resistance.

Facing materials are widely used in motor vehicle construction. In the automotive industry, it is common practice to refer to various surfaces as being A-, B-, or C-surfaces.

As used herein, the term "A-surface" refers to an outwardly-facing surface for display in the interior of a motor vehicle. This surface is a very high visibility surface of the vehicle that is most important to the observer or that is most obvious to the direct line of vision. With respect to motor vehicle interiors examples include dashboards, instrument panels, steering wheels, head rests, upper seat portions, headliners, load floors and pillar coverings.

Sandwich-type panels having cellular cores have very important characteristics because of their light weight and high strength. Conventionally, such panels are constructed by sandwiching a cellular core having low strength characteristics between two skins, each of which is much thinner than the cellular core but has excellent mechanical characteristics.

Figure 3:
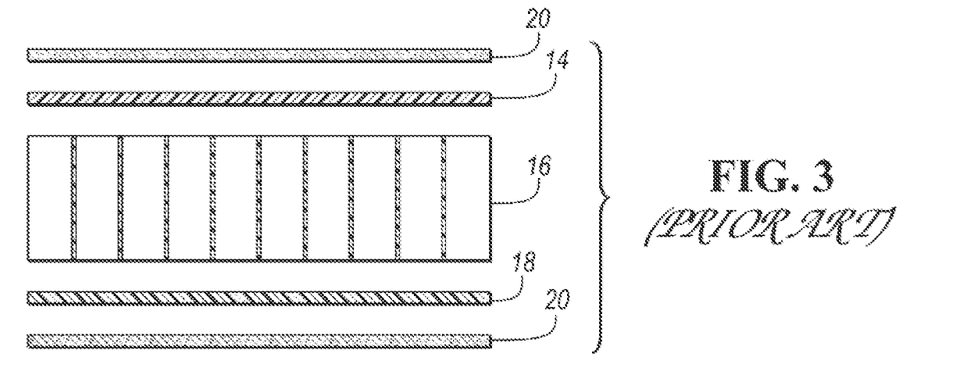
FIG. 3 is a side sectional view, partially broken away, showing various separate layers of a prior art stack or blank of thermoplastic layers of material.
Figure 4:
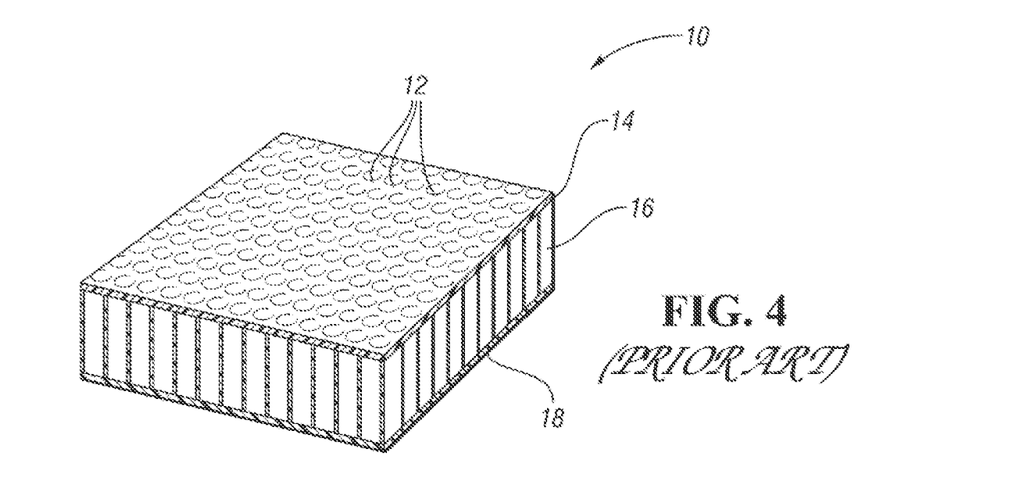
FIG. 4 is a top perspective sectional view of the stack of FIG. 3, but without outer carpet layers after low pressure, cold compression molding.

The prior art (i.e. U.S. Pat. No. 8,834,985) discloses a method of making a panel, generally indicated at 10 in FIG. 4, of a sandwich-type composite structure having a cellular core 16 in a single processing step. In that method, the panel 10 is made by subjecting a stack of layers of material to cold-pressing in a mold. As shown in FIGS. 3 and 4, the stack is made up of at least a first skin 14 made of a stampable reinforced thermoplastics material, the cellular core 16 made of a thermoplastic material, and a second skin 18 also made of a stampable reinforced thermoplastic material. Depressions or imprints 12 may be formed during the method. The stack may also include one or more external covering layers 20 made of a woven or non-woven thermoplastic material. The skins 14 and 18 are typically pre-heated outside the mold to a softening temperature.

Such a method is particularly advantageous because of the fact that it makes it possible, in a single operation, to generate cohesion and bonding between the various layers of the composite structure as shown in FIG. 4, and to shape the resulting panel while preserving all of the mechanical properties imparted by the cellular-core sandwich structure.

One problem associated with the above-noted method of making a panel of sandwich-type composite structure is that during the cold-pressing in a compression mold the air sealed within the cellular core 16 bonded to and between the skins 14 and 18 causes circular portions of one or both of the skins 14 and 18 to move inwardly into and towards the cells of the core 16 along the axes of the cells as the air cools. This causes the outer surface of one or both of the skins 14 and 18 to be debossed as shown in FIG. 4 at 12. Such effect may be termed an "oil-can" effect and results in a pattern of undesirable depressions or imprints 12 on the outer surface of one or both of the skins 14 and 18. Such undesirable depressions 12 can even be seen in facing material bonded to the outer surfaces of the skins 14 and 18 such as the covering layers 20 thereby resulting in a poor surface finish.

U.S. Pat. No. 9,770,849 discloses a method of making a sandwich-type, compression-molded, composite component having improved surface appearance. Resin skins and a core of a blank or stack of sandwich materials are heated to a softening temperature of the resin. A compression mold is provided including component-forming, upper and lower dies with opposing molding surfaces cooperating to define a mold cavity. The heated blank or stack is allowed to cool in the mold cavity until inner surfaces of the skins are bonded to top and bottom surfaces of the core to seal core cavities. Air in the sealed cavities urges softened portions of the skins inwardly towards the cavities of the core as the air in the cavities cools. A vacuum is applied at a first outer surface of the blank or stack in the mold cavity sufficient to prevent debossing and improve appearance of the first outer surface.

Panels of sandwich-type composition structure having a cellular core have rigidity characteristics sufficient to enable mechanical structures subjected to large stresses to be reinforced structurally without making them too heavy. Such panels are in common use in shipbuilding, aircraft construction, and rail vehicle construction.

To maximize the functionality of such panels, it is known, in particular, that hinges can be added so that the panels can be hinged to other panels. Such hinges are separate parts that are fixed to the panels by gluing, welding, riveting, or some other fastening technique.

A wide variety of welding technologies exist to join or bond molded plastic components together such as: ultrasonic welding; vibration welding; thermal welding; spin welding; infrared welding; hot plate welding; and laser welding. U.S. Pat. Nos. 6,066,217 and 5,026,445 are examples of such welding technologies. A problem with welding is the added component weight and costs associated with the use of welding.

Also, a wide variety of adhesives such as liquid and heat-sensitive solid film adhesive may be used to join molded plastic components together. Oftentimes a mold is used in the bonding process. U.S. Pat. Nos. 8,133,419; 5,534,097 and 2011/0315310 disclose examples. A problem with adhesives is the added component weight and costs associated with the use of adhesives.

Such hinges are fixed to the sandwich-structure composite panels in a separate and subsequent operation, after said panels have been formed. The subsequent operation requires an additional workstation, be it automated or otherwise, which increases, in particular, the manufacturing time and the manufacturing cost of the finished parts.

In addition, the fact that separate external parts are mounted on a composite panel of the sandwich-type is a source of quality defects, and thus adds to the cost of making such panels.

Published U.S. Patent Application 2005/0189674 discloses a method of making a composite panel of a sandwich structure with a hinge. The panel includes a stack made up of a first skin of a reinforced thermoplastics material, a cellular core made of thermoplastics material, and a second skin made of a reinforced thermoplastics material. The panel is formed by pressing the stack in a mold. The first and second skins are preheated to a softening temperature. As shown in FIGS. 3 and 4, after the panel has formed, an incision is made at a determined place in the panel so as to cut through one of the first and second skins, and substantially through the entire thickness of the cellular core, while leaving the other skin intact so that it forms a living hinge between two portions of the incised panel.

Other U.S. patent documents related to the present invention include: U.S. Pat. Nos. 5,502,930; 5,915,445; 6,050,630; 6,102,464; 6,435,577; 6,537,413; 6,655,299; 6,682,675; 6,748,876; 6,790,026; 6,682,676; 6,825,803; 6,843,525; 6,890,023; 6,981,863; 7,090,274; 7,419,713; 7,909,379; 7,919,031; 8,117,972; 2006/0255611; 2011/0315310; 2012/0315429; and 2008/0185866.

The following U.S. patent documents relate to cargo management systems and trim panels for automotive vehicles: U.S. Pat. Nos. 6,752,443; 6,800,325; 6,843,525; 6,905,155; 6,926,348; 6,945,594; 7,059,646; 7,090,274; 7,121,601; 7,188,881; 7,207,616; 7,222,915; 7,419,713; 7,628,440; 7,909,379; 8,298,675; 8,475,884; 2004/0078929; 2006/0008609; 2007/0065264; 2007/0256379; 2009/0108639; 2010/0206467; 2011/0260359; 2012/0247654; 2013/0031752; 2013/0075955; and 2013/0137798.

The following U.S. published applications are also related to the present application: 2013/0278002; 2013/0278003; 2013/0278007; 2013/0278009; 2013/0278015; 2013/0278018; 2013/0278019; 2013/0278020; 2013/0280459; 2013/0280472; and 2013/280473.

Beyond carrying cargo, the trunk of most passenger vehicles commonly contains various other components often behind or below a load floor. These components may be accessed by the vehicle's occupants or service personnel through hatches in the load floor or by removing carpet and support boards, etc. Typical components include:

Emergency supplies;
Spare tire;
Jack and lug wrench;
On-board tool kit for do-it-yourself repairs;
Electronics for sound, video GPS, etc.;
Battery and hybrid energy store;
Fuse boxes;
CNG/LPG tanks (for bivalent engines); and
Additional folding, or "third-row," seating.

A problem associated with load floors having covers which cover a storage area in an automotive vehicle is that loose items or objects in the storage area can cause relatively loud, undesirable noises during vehicle travel. Also, when the cover is in its open position the underside of the cover is not particularly visually appealing.

U.S. Pat. No. 8,622,456 discloses a carpeted, automotive vehicle, load floor including a compression-molded composite panel. A cover of the load floor covers a storage area of the vehicle and is pivotally connected to the composite panel. A substantially continuous carpet layer is bonded to the top surface of the panel and the top surface of the cover to at least partially form the carpeted load floor having a carpeted cover. A living hinge allows the carpeted cover to pivot between different use positions including open and closed positions. A decorative, noise-management covering layer is bonded to the bottom surface of the cover to reduce the level of undesirable noise in a passenger compartment of the vehicle in the closed position and to provide an aesthetically pleasing appearance to the bottom of the cover in the open position.

As described in U.S. Pat. No. 9,139,142, vehicle manufacturers in the past relied on two-layers of foam and/or "shoddy" material built up for lightweight constructions, in thickness of approximately one-fourth inch to multiple inches, which were applied in a blanket form to cover surface areas of the vehicle, such as the engine firewall and transmission tunnel, to attenuate vehicle and road noise entering the vehicle passenger compartment. When fuel economy concerns were not as stringent and higher horsepower engines were used, the attenuation systems could be thicker, increasing both their weight and thereby their noise attenuation capability, without significant impact on vehicle performance. As vehicle mile-per-gallon fuel rates have increased and horsepower ratings have decreased, attenuation system weight allowances have necessarily decreased, forcing attenuation system manufacturers to use lighter weight materials. Attenuation system weight has subsequently decreased, but at a tradeoff with acoustic attenuation achieved. It has therefore become desirable to provide acoustic attenuation systems that provide attenuation levels similar to the prior thicker/heavier designs while providing the benefits of reduced weight.

Another problem associated with such composites is that their function and design freedom is limited by the material which make up the composites. For example, one or more additional components are typically required to add one or more patterns, such as style features at the outer surface of the component.

Vehicle cargo compartments may be equipped with floor trays, liners or mats to protect underlying flooring, e.g., carpeting from exposure to liquids, dirt, debris and other elements that are tracked into the vehicle. Vehicle floor trays may include fitted sidewall portions to provide protective covering. Known three-dimensional floor trays may be molded from polymers having sufficient stiffness to retain the molded shape. Known floor mat system may include a single-piece continuous floor tray that covers the entire cargo floor.

SUMMARY OF EXAMPLE EMBODIMENTS

An object of at least one embodiment of the present invention is to provide a component having a sandwich-type, composite structure wherein a protective coating is sprayed onto a backside of the component which may be a vehicle interior component such as a vehicle load floor.

In carrying out the above object and other objects of at least one embodiment of the present invention, a sandwich-type, composite component having a sprayed backside protective coating is provided. The component includes a first outer layer having an outer surface, a protective coating integrally formed from a sprayable liquid elastomeric material, a second outer layer and a core positioned between the outer layers and having a plurality of cavities. The outer layers are bonded to the core. The material is sprayed to form the coating and the coating is bonded to the outer surface by curing the coating on the outer surface.

The elastomeric material may be either a thermoset material or a thermoplastic material.

The coating may be made of a textured material.

The coating may be made of a synthetic rubber material.

The coating may be made of a rubberized plastic material.

The coating may be an acoustic barrier layer of sound-damping, elastomeric material.

The coating may comprise a layer of liquid rubber polymer sprayed either directly unto the outer surface or onto an interior surface of a mold used to bond the outer layers to the core in a press molding process.

The core may be a cellular core.

The core may be a thermoplastic core.

The core may be a honeycomb core which may be a thermoplastic honeycomb core.

The outer layers are fiber-reinforced plastic layers.

The second outer layer may be a load-bearing layer.

The outer surface may be a B-surface.

The acoustic barrier layer may have a thickness that ranges from approximately 0.1 mm to approximately 4.0 mm to provide noise transmission obstruction.

Further in carrying out the above object and other objects of at least one embodiment of the present invention, a sandwich-type, vehicle interior component having a sprayed backside protective coating is provided. The component includes a first outer layer having an outer surface, a protective coating integrally formed from a sprayable liquid elastomeric material, a second outer layer and a core positioned between the outer layers and having a plurality of cavities. The outer layers are bonded to the core. The material is sprayed to form the coating and the coating is bonded to the outer surface by curing the coating on the outer surface.

The elastomeric material may be either a thermoset, sound-damping material or a thermoplastic, sound-damping material for noise reduction in the vehicle.

Still further in carrying out the above object and other objects of at least one embodiment of the present invention, a sandwich-type, vehicle load floor component having a sprayed backside protective coating is provided. The component includes a first outer layer having an outer surface, a protective coating integrally formed from a sprayable liquid elastomeric material, a second outer layer and a core positioned between the outer layers and having a plurality of cavities. The outer layers are bonded to the core. The material is sprayed to form the coating and the coating is bonded to the outer surface by curing the coating on the outer surface.

The elastomeric material may be either a thermoset, sound-damping material or a thermoplastic, sound-damping material for noise reduction in the vehicle.

Other technical advantages will be readily apparent to one skilled in the art from the following figures, descriptions and claims. Moreover, while specific advantages have been enumerated, various embodiments may include all, some or none of the enumerated advantages.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
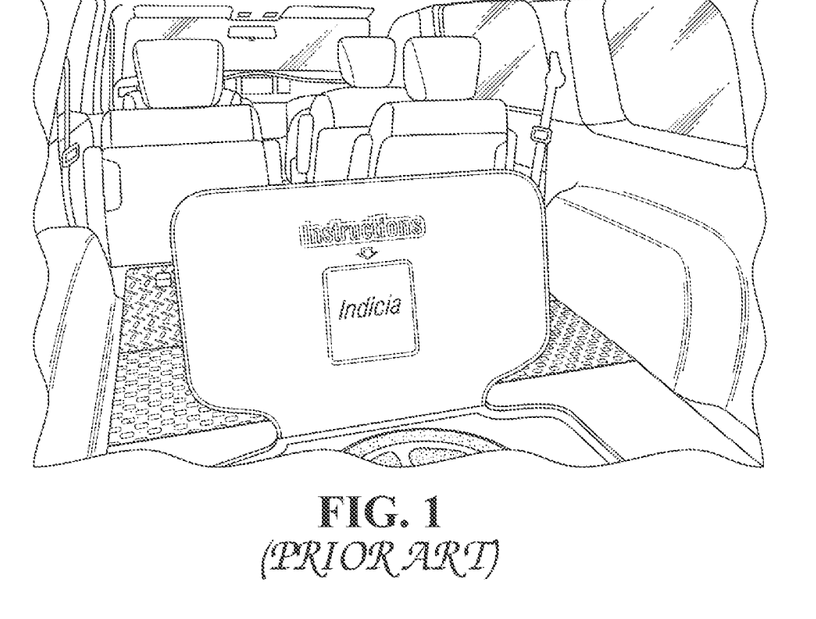
FIG. 1 is an environmental view, partially broken away, of a prior art load floor with a movable cover in its open position to show imprinted 3-D structures on backside of the cover.
Figure 2:
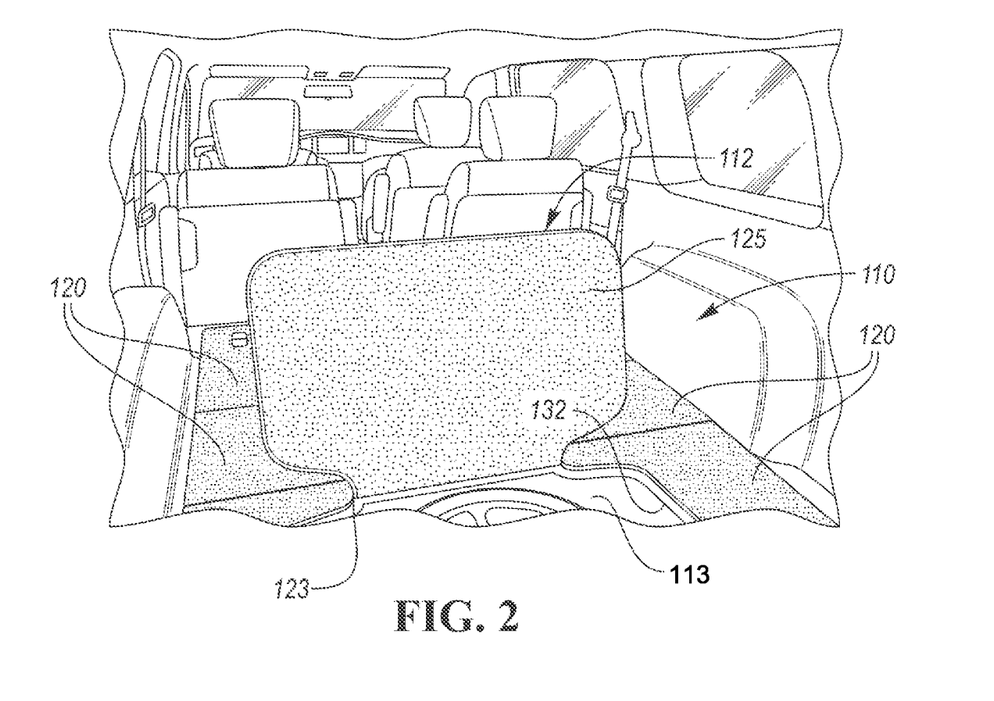
FIG. 2 is a view, similar to the view of FIG. 1, that shows a sprayed backside protective coating on a moveable cover of a load floor constructed in accordance with at least one embodiment of the present invention.
Figure 5:
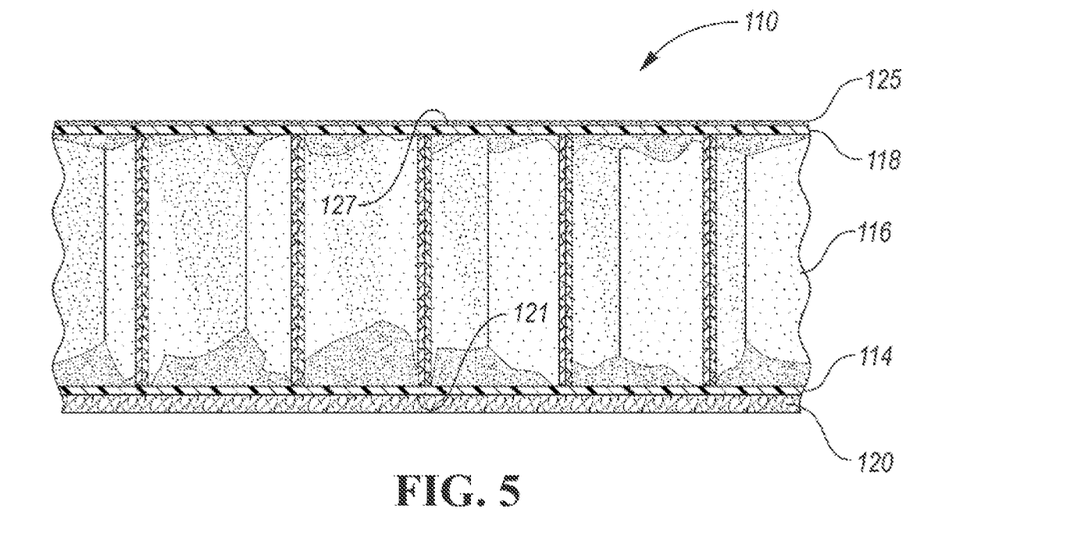
FIG. 5 is an enlarged upside down view, partially broken away and in cross-section, of a sandwich-type, composite component after an outer, bottom, class-B surface of one of the outer layers has been sprayed and cured with a liquid elastomeric material to form a protective coating.
Figure 6:
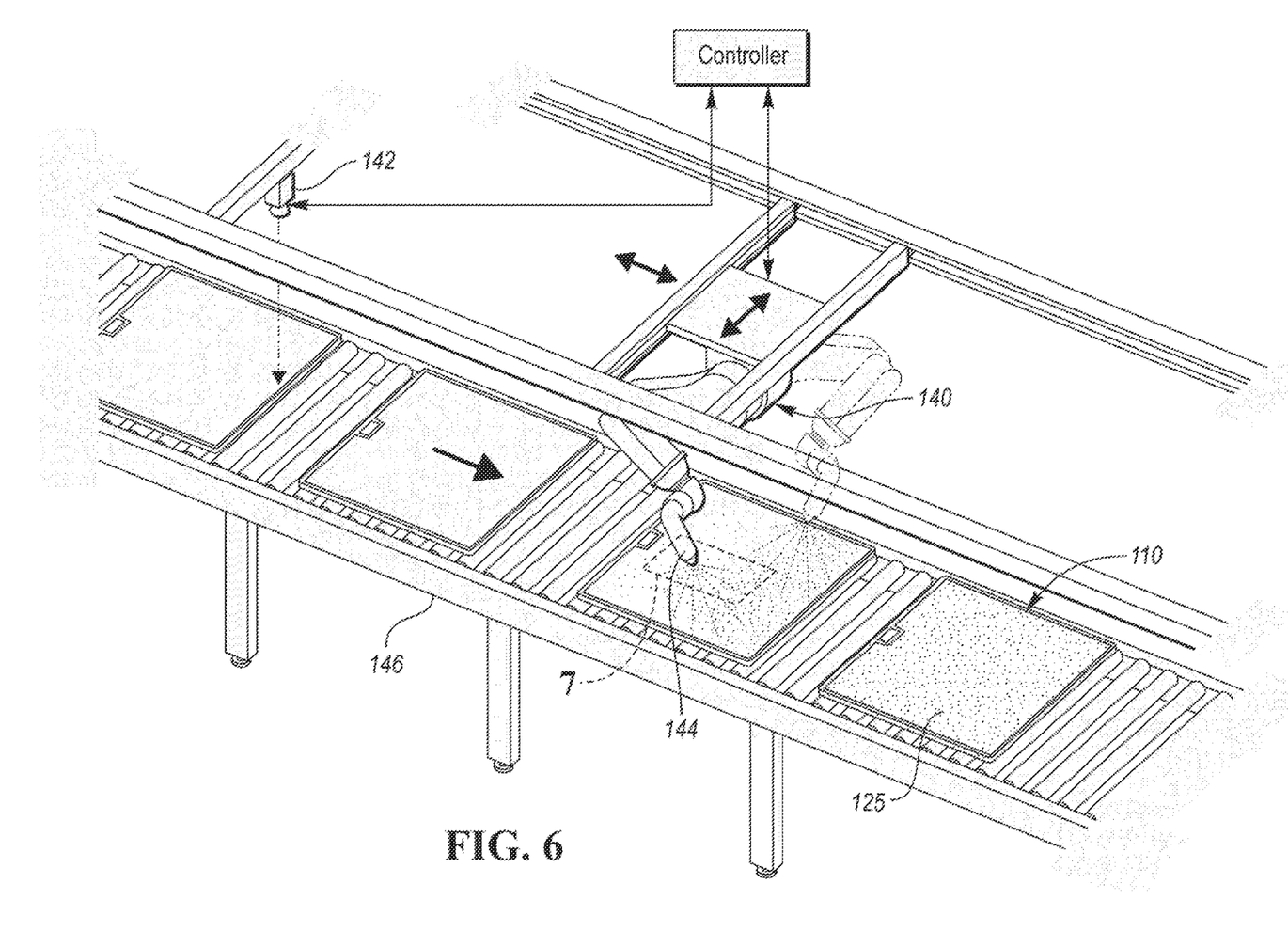
FIG. 6 is a view, partially broken away, showing a vision sensor and a multi-axis robot having a sprayer controlled by a controller wherein the robot is capable of spraying the liquid elastomeric material on the backside of a sandwich-type, composite component conveyed by a conveyor.

Referring to FIGS. 2, 5 and 6 there is shown a carpeted, automotive vehicle, load floor, generally indicated at 110, including a compression-molded, composite panel constructed in accordance with at least one embodiment of the present invention. A cover, generally indicated at 112, of the load floor 110 covers a storage area 113 of the vehicle and is pivotally connected to the composite panel. A substantially continuous carpet layer 120 may be bonded to the outer, top, class-A surface 121 of the panel and the top surface of the cover 112 to at least partially form the carpeted load floor 110 having the carpeted cover 112. A living hinge 123 allows the carpeted cover 112 to pivot between different use positions including the open position of FIG. 2. A decorative, noise-management covering layer or protective coating 125 is bonded to the bottom surface of the cover 112 (as well as the bottom surface 127 of the rest of the load floor 110) to reduce the level of undesirable noise in a passenger compartment of the vehicle in its closed position and to provide an aesthetically pleasing appearance to the bottom of the cover 112 in its open position (i.e. FIG. 2).

As is well known in the art, the load floor 110 is typically manufactured by providing a stack of material located or positioned within a mold (not shown). The stack includes first and second reinforced thermoplastic skins or outer layers 114 and 118, respectively, a core 116 having a large number of cavities such as a thermoplastic cellular core disposed between and bonded to the skins 114 and 118 by press molding. The substantially continuous covering or carpet layer 120 is typically made of thermoplastic material and covers the first skin 114. The skins 114 and 118 are heated typically outside of the mold to a softening temperature. The mold is preferably a low-pressure, compression mold which performs a thermo-compression process on the stack of materials.

The thermoplastic carpet layer 120 not only covers the first skin 114, but also covers and is bonded to an outer surface of the outer skin of the cover 112. An intermediate portion of the layer 120 may not be bonded to the outer skin to form the living hinge 123. The living hinge 123 allows the carpeted cover 112 to pivot between the different use positions.

The carpet layer 120 may be resin carpet and the resin may be polypropylene. One side of the cover 112 may be covered with the carpet layer 120 which may be made of a woven or nonwoven material (typically of the carpet type).

The cellular core 116 may be a honeycomb core. In this example, the cellular core 116 has an open-celled structure of the type made up of tubes or a honeycomb, and it is made mainly of polyolefin and preferably of polypropylene. It is also possible to use a cellular structure having closed cells of the foam type. Alternatively, the core 116 may be made of cellulose (i.e. treated paper).

Each of the skins 114 and 118 may be fiber reinforced. The thermoplastic of the skins 114 and 118, the covering layer 120 and the core 114 may be polypropylene. At least one of the skins 114 and 118 may be woven skin, such as polypropylene skin. Each of the skins 114 and 118 may be reinforced with fibers, e.g., glass fibers, carbon fibers or natural fibers. At least one of the skins 114 and 118 may advantageously be made up of woven glass fiber fabric and of a thermoplastic material.

The resulting hinged load floor 110 may have a thickness in the range of 5 to 25 mm.

In one example method of making the hinged load floor 110, stacks of material may be pressed in a low pressure cold-forming mold. The stack is made up of the first skin 114, the cellular core 116, the second skin 118 and the covering layer 120, and is pressed at a pressure lying in the range of $10 \times 10^5$ Pa. to $30 \times 10^5$ Pa. The first and second skins 114 and 118 are preferably pre-heated to make them malleable and stretchable. Advantageously, in order to soften the first and second skins 114 and 118, respectively, heat is applied to a pre-assembly constituted by the stack made up of at least the first skin 114, the cellular core 116, and the second skin 118 so that, while a part of the load floor 110 is being formed in the mold, the first and second skins 114 and 118 have a forming temperature lying approximately in the range of 160° C. to 200° C., and, in this example, about 180° C. In like fashion, the cover 112 may be formed.

Figure 7:
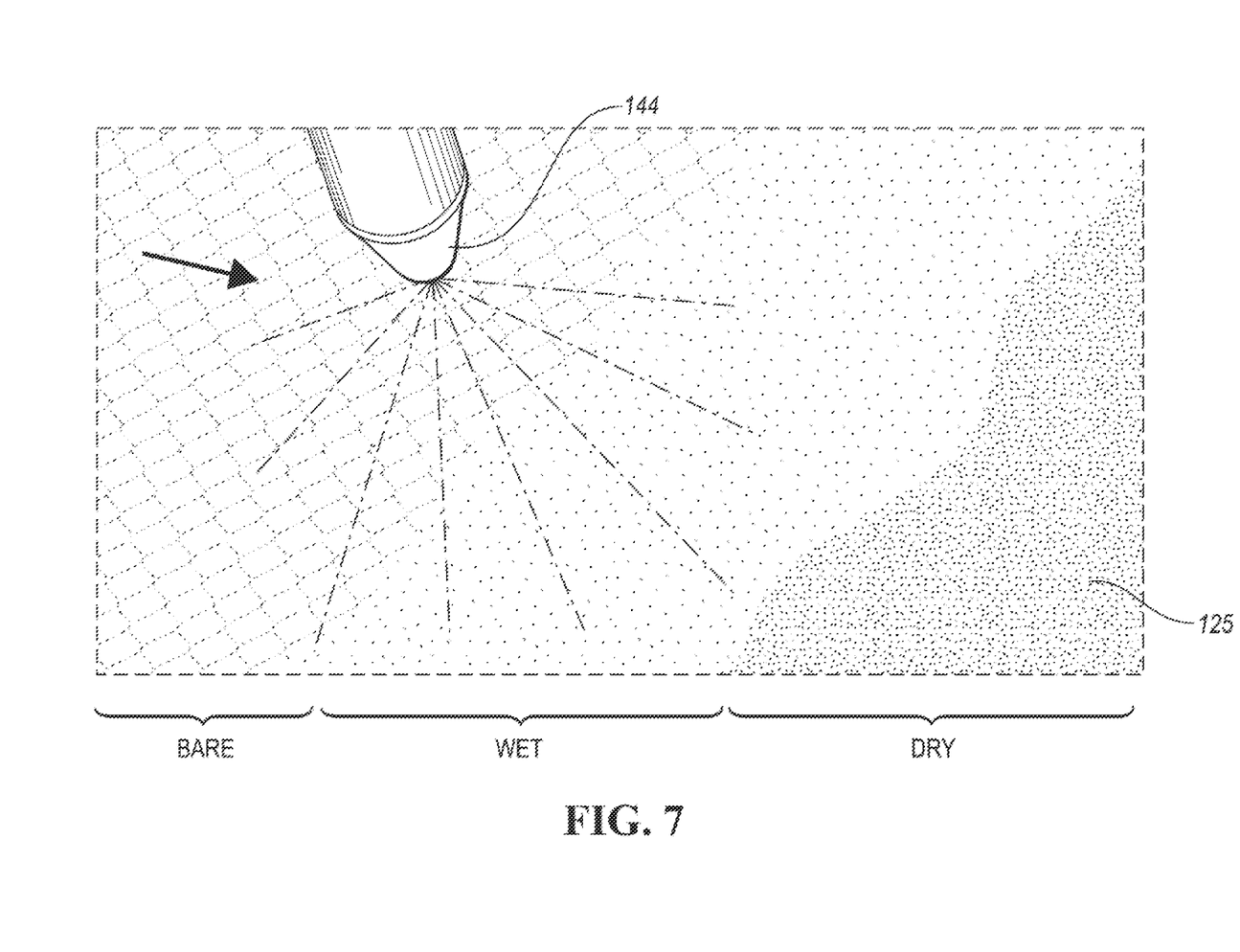
FIG. 7 is an enlarged view, partially broken away, and taken within the phantom rectangle labeled "7" of FIG. 6, of the sprayer wherein a first portion of a component is bare (i.e. before spraying of the material), a second intermediate portion of the component is wet after spraying and a third portion of the component is dry after the liquid material has cured.

The protective coating 125 may be integrally formed from a sprayable liquid elastomeric material generally of the type described in U.S. Pat. No. 8,137,500. The material typically is a sprayable low-viscosity, rubber, sound-damping compound based on liquid rubbers or elastomers and vulcanization agents, which may contain small quantities of structure-reinforcing fiber fillers, and have a very low viscosity in the application state. As shown in FIG. 6, acoustic compounds of this kind are sprayable with the aid of fully automatic application systems, such as a spray robot, generally indicated at 140, controlled by a robot controller. The controller typically receives control signals from a vision or optical sensor 142 to control the spray robot 140 and a liquid sprayer 144 carried by the robot 140. As shown in FIG. 6, typically, load floors are carried by a conveyor 146 under the sensor 142 past the robot 140 which sprays the load floors upon being sensed by the sensor 142. Different stages of the spraying process are shown in FIG. 7 (i.e. bare, wet and dry). Using an automatic application system allows one to easily change colors of the material.

The elastomeric material may be either a thermoset material or a thermoplastic material or a mixture of both. The material may be a polyurethane.

The elastomeric material may be a textured material.

The elastomeric material may be synthetic rubber material or a rubberized plastic material. The acoustic barrier layer or coating 125 may be sprayed either directly on the outer surface 127 of the skin 118 or onto an interior surface of a mold used to bond the skins 118 and 114 to the core 116 in a press molding process.

The resulting thickness of the coating 125 typically is in the range of approximately 0.1 mm to approximately 4.0 mm to provide noise transmission obstruction.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A sandwich-type, carpeted, vehicle load floor comprising:
a sandwich-type, carpeted cover including: a first outer layer having an outer surface; a protective, acoustic barrier, sprayed layer bonded to the outer surface of the first outer layer wherein the sprayed layer overlies and is in contact with the first outer layer; a second outer layer having an outer surface; a substantially continuous carpet layer which covers and is bonded to the outer surface of the second outer layer and is bonded to a top surface of the rest of the load floor wherein an intermediate portion of the carpet layer between the carpeted cover and the rest of the load floor is not bonded to either the carpeted cover or the rest of the load floor to form a living hinge which allows the carpeted cover to pivot between covered and uncovered positions relative to the rest of the load floor; and a cellular core positioned between the outer layers and having a plurality of cavities wherein the outer layers are bonded to the core and wherein the sprayed layer is integrally formed from a sprayable, liquid elastomeric material, the liquid elastomeric material being a rubberized plastic material comprised of a mixture of a thermoset material and a thermoplastic material and wherein the sprayed layer reduces a level of undesirable noise in the covered position of the carpeted cover and provides an aesthetically pleasing appearance to the carpeted cover in the uncovered position of the carpeted cover and wherein the sprayed layer is bonded to a bottom surface of the rest of the load floor to reduce the level of undesirable noise in a passenger compartment of the vehicle.

2. The load floor as claimed in claim 1, wherein the outer surface of the first outer layer is a backside surface of the carpeted cover.

3. The load floor as claimed in claim 1, wherein the cellular core is a honeycomb core.

4. The load floor as claimed in claim 1, wherein the cellular core is a plastic core.

5. The load floor as claimed in claim 1, wherein the cellular core is a plastic honeycomb core.

6. The load floor as claimed in claim 1, wherein the outer layers are fiber-reinforced plastic layers.

7. The load floor as claimed in claim 1, wherein the second outer layer is configured to be a load-bearing layer.

8. The load floor as claimed in claim 1, wherein the carpet layer is a plastic carpet layer.

9. The load floor as claimed in claim 1, wherein the carpet layer is a resin carpet.

10. The load floor as claimed in claim 9, wherein the resin is polypropylene.

11. The load floor as claimed in claim 1, wherein the carpet layer is made of a woven or non-woven material.

12. The load floor as claimed in claim 1, wherein the outer layers are fiber-reinforced thermoplastic layers.

13. A vehicle comprising:
- a passenger compartment having a deck with a storage area located below a part of the deck; and
- a sandwich-type, carpeted, load floor arranged on the passenger compartment deck;
- the load floor including a sandwich-type, carpeted load floor portion and a sandwich-type, carpeted cover, the carpeted cover being arranged adjacent the passenger compartment storage area;
- the carpeted cover including: a first outer layer having an outer surface; a protective, acoustic barrier, sprayed layer bonded to the outer surface of the first outer layer wherein the sprayed layer overlies and is in contact with the first outer layer; a second outer layer having an outer surface; a substantially continuous carpet layer which covers and is bonded to the outer surface of the second outer layer and is bonded to a top surface of the load floor portion wherein an intermediate portion of the carpet layer between the carpeted cover and the load floor portion is not bonded to either the carpeted cover or the load floor portion to form a living hinge which allows the carpeted cover to pivot relative to the load floor portion between a covered position in which the carpeted cover covers the passenger compartment storage area and an uncovered position in which the carpeted cover uncovers the passenger compartment storage area; and a cellular core positioned between the outer layers and having a plurality of cavities wherein the outer layers are bonded to the core and wherein the sprayed layer is integrally formed from a sprayable, liquid elastomeric material, the liquid elastomeric material being a rubberized plastic material comprised of a mixture of a thermoset material and a thermoplastic material and wherein the sprayed layer reduces a level of undesirable passenger compartment storage area noise in the covered position of the carpeted cover and provides an aesthetically pleasing appearance to the carpeted cover in the uncovered position of the carpeted cover; and
- wherein the sprayed layer is bonded to a bottom surface of the load floor portion to reduce the level of undesirable noise in the passenger compartment.

* * * * *